United States Patent
Hamilton

(12) 
(10) Patent No.: US 6,954,972 B2
(45) Date of Patent: Oct. 18, 2005

(54) INSTALLATION TOOL

(75) Inventor: Bruce W. Hamilton, Lockport, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 201 days.

(21) Appl. No.: 10/410,963

(22) Filed: Apr. 10, 2003

(65) Prior Publication Data

US 2004/0200052 A1 Oct. 14, 2004

(51) Int. Cl.[7] .......................................... B25B 27/14
(52) U.S. Cl. .................................................. 29/281.5
(58) Field of Search .......................... 29/281.1, 281.5, 29/270, 278, 280, 281.6, 282, 283, 283.5; 254/389, 134.3 R, 134.3 FT, 134.3 PA; 14/69.5; 16/110.1, 410, 415, 430, 422, 425

(56) References Cited

U.S. PATENT DOCUMENTS 2,936,478 A * 5/1960 Hegji .......................... 16/444
4,865,294 A * 9/1989 Kaczynski ............ 254/134.3 R

* cited by examiner

Primary Examiner—Robert C. Watson
(74) Attorney, Agent, or Firm—Susan L. Lukasik; Dennis Kelly Sullivan; Jeffrey P. Calfa

(57) ABSTRACT

An apparatus for and method of inserting, retaining, protecting, and positioning a bearing (101) or other parts of similar construction or manufacture includes an installation tool (300) that utilizes a saddle (301) capable of seating the bearing (101), and members that position the bearing with respect to a mating part, e.g., a connecting rod (201). The installation tool (300) protects and retains the bearing (101) with its mating part (201 or 203) throughout the installation and/or assembly process.

24 Claims, 3 Drawing Sheets

US 6,954,972 B2

INSTALLATION TOOL

FIELD OF THE INVENTION

This invention relates to tools utilized in manufacturing, including but not limited to tools utilized to insert a bearing into a mating part.

BACKGROUND OF THE INVENTION

Many manufacturing processes require the insertion of a bearing into a mating part. The bearing often needs to be precisely aligned to the mating part for proper operation of the bearing. One known method for such alignment is shown in FIG. 1. A bearing 101 has tangs or tabs 103 that extend away from the bearing 101. The bearing 101 is to be inserted in a mating part 105 that has notches 107 formed in such a way that when the bearing 101 is inserted into the mating part 105 correctly, the tangs 103 fit into place in the notches 107, thereby correctly aligning the bearing 101 and mating part 105.

The use of tangs in manufacturing is complex and is more expensive than making a part without tangs. The expense comes from the high-precision manufacturing operations utilized to create the tangs and notches, in addition to inspection for conformity and a higher potential for scrap parts that occur when the tangs or notches are not properly formed and the bearing or mating part must be scrapped. The use of tangs also requires hand insertion of the bearing into the mating part. Handling of the bearing may introduce contamination to the bearing, which may be sensitive to foreign materials. Depending on the process, the bearings, once inserted, are held in place by friction or gravity, and may unintentionally separate from the mating part during manufacturing and field service.

Accordingly, there is a need for a method of aligning a bearing to its mating part without the use of complex and expensive tangs, protecting the bearing from foreign material, eliminating the need to touch the bearing by hand, and that retains the part in position as long as necessary.

SUMMARY OF THE INVENTION

An installation tool comprises a saddle having a first peripheral surface capable of seating a peripheral surface of a bearing. The saddle has a first edge along a first length of the saddle and a second edge along a first width of the saddle. A first fence is disposed near the first edge of the saddle and extends away from the first peripheral surface in a first substantially perpendicular direction. A first flange is disposed near the second edge of the saddle and extends away from the first peripheral surface in a second substantially perpendicular direction. The installation tool facilitates positioning of the bearing with respect to a mating part.

DESCRIPTION OF A PREFERRED EMBODIMENT

The following describes an apparatus for and method of inserting, retaining, protecting, and positioning a bearing or other parts of similar construction or manufacture. An installation tool utilizes a saddle capable of seating the bearing, and members that position the bearing with respect to a mating part, e.g., a connecting rod or cap. The installation tool protects and retains the bearing with its mating part throughout the installation and/or assembly process.

Figure 2:
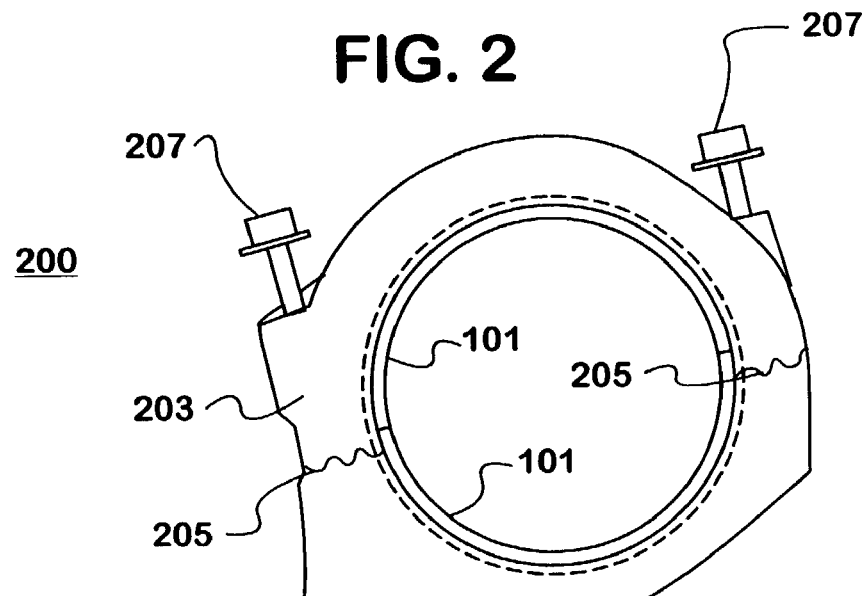
FIG. 2 is a diagram of a connecting rod with a cap and with bearings inserted in accordance with the invention.
Figure 1:
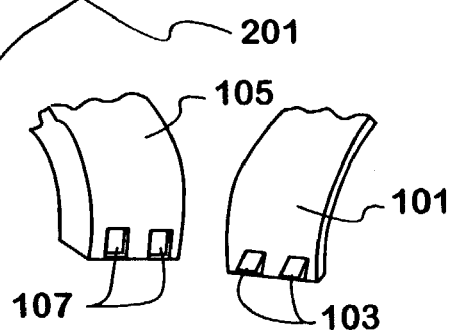
FIG. 1 is a diagram showing a bearing with tangs and a mating part with notches.

A diagram of a connecting rod with a cap and with bearings inserted is shown in FIG. 2. A connecting rod 201 with its matching cap 203 are shown with cracks 205 formed about 180 degrees apart. Although FIG. 2 shows the connecting rod and its cap formed using cracking technology, the present invention may be utilized with connecting rods and caps manufactured with any method or technology, including those known in the art.

The connecting rod/cap 201/203 is cast or otherwise formed as a single piece with two holes, one at each end. One or more bearings are needed on the inner periphery of the hole that interfaces the connecting rod with a crank pin on a crankshaft in an internal combustion engine. Typically, two semi-circular bearings 101 of 180 degrees each are positioned snugly along the inner periphery of the hole to provide an interface to the crank pin. Because of the extreme difficulty of inserting these bearings 101 in such a hole, the unitary connecting rod/cap 201/203 is divided in two pieces, the rod 201 and the cap 203. In the example shown in FIG. 2, the unitary connecting rod/cap 201/203 is cracked by striking a forceful blow at two locations approximately 180 degrees apart along the desired hole. Dividing the unitary connecting rod/cap 201/203 into two pieces allows for insertion of two semi-circular bearings 101 on the inner periphery of the connecting rod 201.

Although the connecting rod 201 and cap 203 line up well when joined together after the splitting process, it is impossible to predict exactly where along the hole the cracks 205 will occur. As a result, the cracks 205 do not necessarily line up with the ends of the precisely tooled bearings 101 that are typically, though not necessarily, constructed with tight tolerances to 180 degrees in arc. The example shown in FIG. 2 shows that the cracks 205 formed the connecting rod 201 with an inner periphery of less than 180 degrees and the cap 203 that has an inner periphery of greater than 180 degrees. Bolts 207 that correspond to holes formed in the connecting rod 201 and cap 203 hold the connecting rod 201 and cap 203 together.

Figure 3:
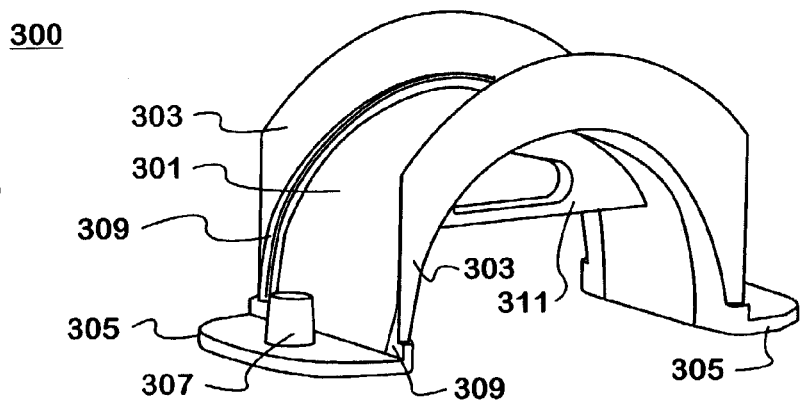
FIG. 3 is a perspective view of a bearing installation tool in accordance with the invention.
Figure 4:
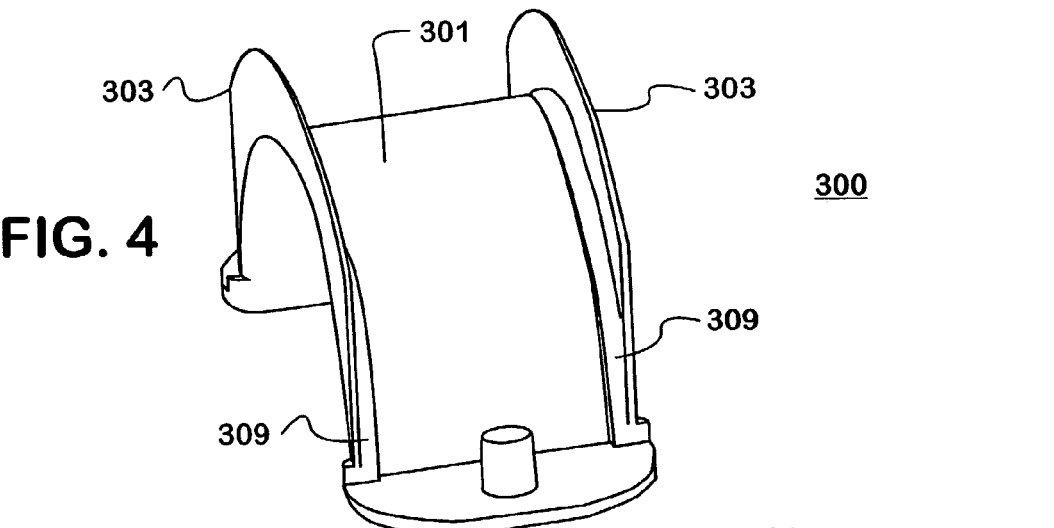
FIG. 4 is a perspective view focusing on a side of the bearing installation tool in accordance with the invention.
Figure 5:
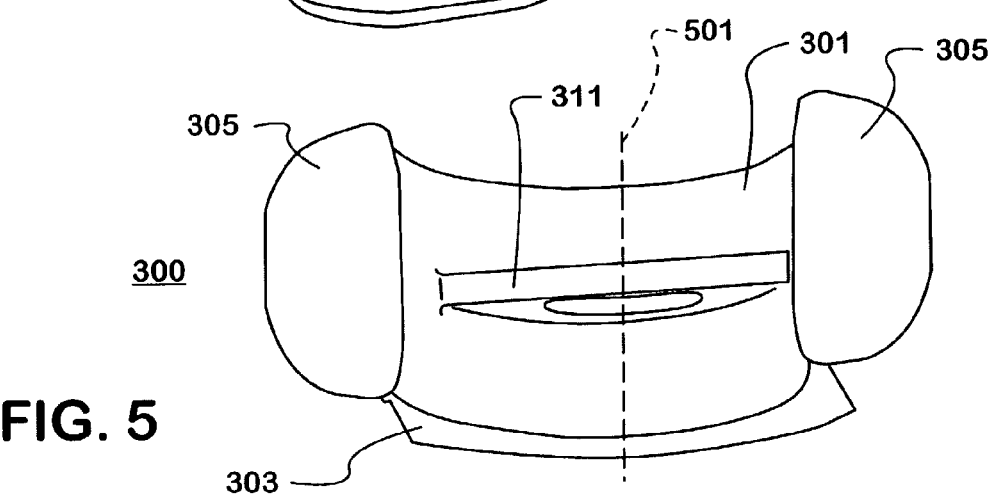
FIG. 5 is a perspective view focusing on an inner periphery of the bearing installation tool in accordance with the invention.

A perspective view of a bearing installation tool 300 suitable for installing bearings into a connecting rod 201 and a cap 203 are shown in FIG. 3, FIG. 4, and FIG. 5. A saddle 301 is shaped to receive or seat a bearing 101. Because the bearings in the embodiment shown are semi-circular, the saddle 301 is shaped to receive a semi-circular bearing 101.

The shape of the outer periphery of the saddle 301 may perfectly match the shape of the inner periphery of the bearing 101 or may have some mismatch, e.g., the periphery need not be a continuous surface and/or the surface of the saddle may allow for play near the ends of the bearing 101 and may allow for flexibility of the bearing 101, as long as the saddle 301 is capable of seating the bearing 101.

In one embodiment of the present invention, the bearing 101 has a radius of curvature greater than the radius of curvature of the mating connecting rod 201 or cap 203. When inserted, the bearing 101 deflects to conform to the lesser radius of curvature of the rod 201 or cap 203. The saddle 301 is configured to allow for the deflection of the bearing 101, thereby providing full insertion of the bearing 101. The present invention also operates successfully with bearings 101 that do not have a radius of curvature greater than the radius of curvature of the mating connecting rod 201 or cap 203.

One or more fences 303 are disposed near the edges along the lengths of the saddle 301. The connecting rod 201 and cap 203 have an intended thickness in the axial direction. Variations in the thickness of the rod 201 and cap 203 result from variations in the manufacturing process. The fences 303 are separated by a distance that represents the intended thickness of the rod 201 and cap 203, while taking into account the limits of variation of thickness of the rod 201 and cap 203. The fences 303 fit tightly against the connecting rod 201 or cap 203 and facilitate positioning of the bearing 101 axially with respect to the connecting rod 201 or cap 203 when the bearing 101 and tool 300 are inserted into the approximately semi-circular hole in the connecting rod 201 or cap 203. Thus, the fences 303 are advantageously separated by a distance that is slightly less than the minimum intended thickness of the rod 201 and cap 203, thereby providing good retention of the bearing 101 and the rod 201 or cap 203. The fences 303 are fabricated of a suitably elastic material that deflects to fit the thickness of the rod 201 or cap 203. Friction results between the fences 303 and the sides of the rod 201 or cap 203. Such friction acts to resist, but does not prevent, either insertion or removal of the tool 300, thereby facilitating the tool 300 to remain in place as long as is desired, retaining: 1) the bearing 101 itself; 2) the bearing's seated position against a rod 201 or cap; 3) the bearing's angular position; and 4) the bearing's axial position.

Any method or technology for dividing the unitary connecting rod/cap 201/203 results in connecting rods 201 with matching caps 203 that vary in that each of the devices may not extend exactly 180 degrees in the angular direction, i.e., there is typically a variation from 180 degrees in each part due to the inherently inexact dividing process, although both the rod 201 and matching cap 203 together extend 360 degrees. For example, if the rod 201 extends 178.0 degrees, its matching cap 203 extends 182.0 degrees; if the rod 201 extends 181.1 degrees, its matching cap 203 extends 178.9 degrees; and so forth. The bearings 101, however, may be precisely tooled and constructed with tight tolerances to 180 degrees. As a result, both ends of the bearings 101 and the cracks 205 of the rod 201 and cap 203 may not be capable of being lined up angularly.

Installing the bearings 101 with their ends close to the ends of the connecting rod 201 and cap 203 allows for easier joining of the connecting rod 201 and cap 203. The tool 300 includes one or more flanges 305 that facilitate positioning of the bearing 101 angularly with respect to the connecting rod 201 or cap 203 upon bearing 101 insertion in either the connecting rod 201 or cap 203. The flanges 305 are placed angularly along the saddle to provide for the limits of variation of the connecting rod 201 or cap 203.

One or more flanges 305 are disposed near the edges along the widths of the saddle 301. When two flanges 305 are utilized, they extend in substantially the same plane, but in opposite directions, away from the periphery of the saddle 301. Thus, the flanges 305 are substantially perpendicular to the saddle 301 near the outer edges of the saddle 301. The flanges 305 position the bearing 101 within a desirable tolerance of the ends of the connecting rod 201 or cap 203 so that the bearing 101 does not extend too far from either end or crack 205 of the connecting rod 201 or cap 203. Thus, the flanges 305 limit the angular position of the bearing 101 with respect to the connecting rod 201 or cap 203 and keep the bearing in place angularly within the connecting rod 201 or cap 203.

One or more optional guideposts 307 may be disposed on one or more of the flanges 305. The guideposts 307 fit in the holes in which the bolts 207 are fastened and aid in aligning the tool 300 with the connecting rods 201 and caps 203. See FIG. 8 for more detail on how the guideposts 307 operate in conjunction with the bolt holes.

One or more optional curbs 309 may be disposed in and along the corners where the saddle 301 and fences 303 meet. In the embodiment shown, each curb 309 has a surface that is separated from and substantially parallel to one or more fences 303. When inserted into the tool, the bearing 101 is adjacent to the curb(s) 309. When utilized, the curbs 309 position the bearing axially and keep the bearing in place axially within the connecting rod 201 or cap 203.

An optional member 311 may be disposed on the inner periphery of the saddle 301. The member 311 serves as a manual pull-tab or release to facilitate gripping of the tool 300, for example, when removing the tool 300 from the bearing 101. The member may be solid or may have a hole to facilitate removal of the tool by a finger or a hook. The hole may be shaped to aid automatic or robotic pick and place machines in addition to use with hand tools or hands. The member may have one or more lips (not shown) that extend away from the member and facilitate the use of fingers to grip the tool. The member may be designed as or with a handle, such as a screwdriver handle or similar handle. Thus, the need for physical handling of the bearing is significantly reduced.

Figure 6:
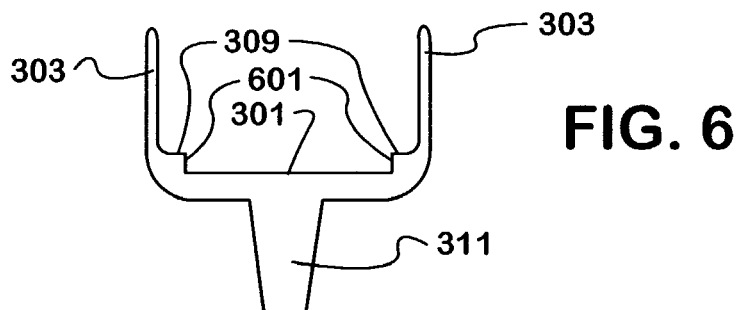
FIG. 6 is a cross-sectional view of the bearing installation tool in accordance with the invention.
Figure 7:
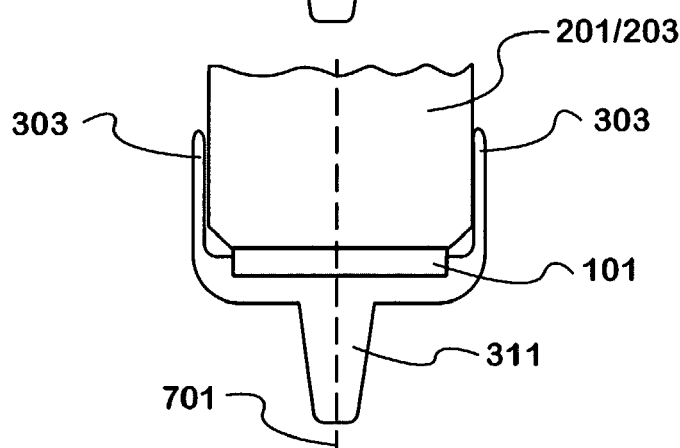
FIG. 7 is a cross-sectional view of the bearing installation tool shown after placing a bearing in a connecting rod or cap in accordance with the invention.

A cross-sectional view of the bearing installation tool is shown in FIG. 6. The cross section is shown through line 501 of FIG. 5. The use of two curbs 309 is shown. A cross-sectional view of the bearing installation tool shown after placing a bearing in a connecting rod or cap is shown in FIG. 7. The cross section is also shown through line 501 of FIG. 5. The bearing 101 fits between the curbs 309 and is advantageously adjacent to both curbs 309. The curb 309 separates the bearing 101 from the fence, and thus separates the bearing 101 from the outermost periphery of the connecting rod 201 or cap 203 during installation. This feature is desirable, for example, when the connecting rod 201 or cap 203 requires the bearing to be inserted away from the outermost edge (axially) of the connecting rod 201 or cap 203. As shown in FIG. 7, the connecting rod 201 or cap 203 has a cut-out or beveled corner where the bearing 101 does not touch. The curbs 309 hold the bearing 101 in a position such that it is not positioned over the cut-out. Although a symmetrical connecting rod 201 or cap 203 is shown, the present invention may be applied to asymmetrical parts by adjusting the distance of the curb from the fence 303 or eliminating the curb altogether.

Figure 8:
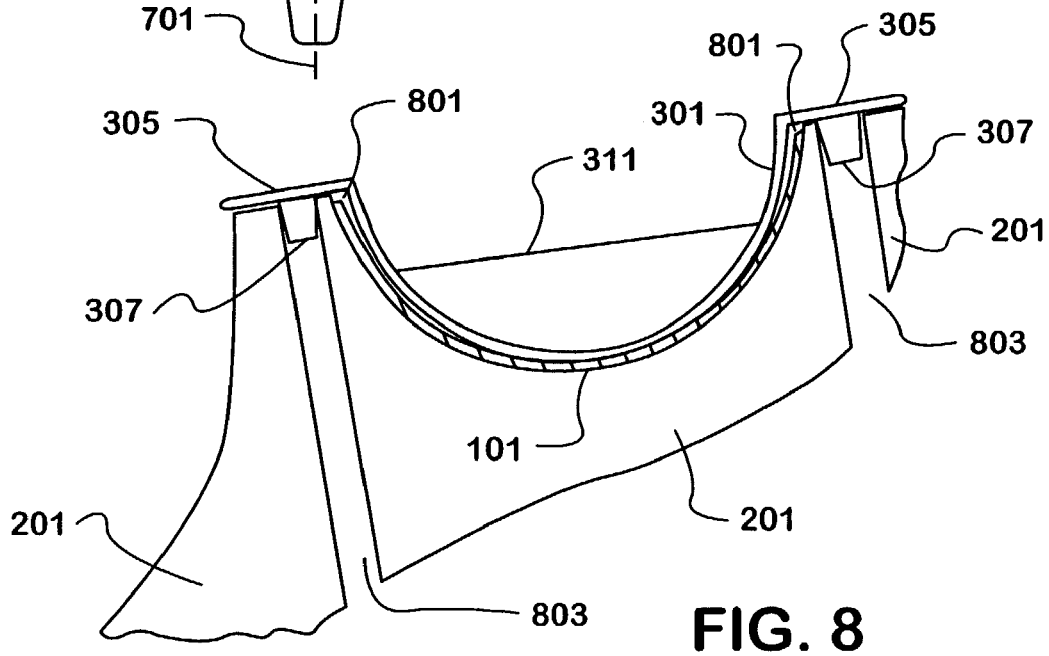
FIG. 8 is a cross-sectional view of the bearing installation tool shown after placing a bearing in a connecting rod or cap in accordance with the invention.

A cross-sectional view of the bearing installation tool shown after placing a bearing in a connecting rod or cap is shown in FIG. 8. The cross section is shown through line 701 of FIG. 7. A bearing 101 is placed on the saddle 301 of the tool 300 and inserted into the connecting rod 201. In this example, the bearing 101 is adjacent to the saddle 305 at the center of the semi-circle forming the bearing, but spaces 801 gradually form on either end of the bearing 101 between the tool and the bearing 101 to allow for flexibility of the bearing 101. The guideposts 307 fit inside the holes 803 in which the bolts 207 fasten.

The tool 300 may be left in place during engine assembly. After the pistons are stuffed in the cylinders and before the caps 203 connected to the connecting rods 201, the tools are removed. Because tools 300 remain on the connecting rods 201 and caps 203 until the rods 201 and caps 203 are matched and fastened, the bearings 101 are protected from contamination and are retained in position with more force than with the use of tangs and notches. Bearings 101 may be inserted into tools 300 and sold together for convenient field maintenance.

For protection of the bearing 101 in its mating part, e.g., a connecting rod 201 or cap 203, the bearing 101 is encased between the tool 300 and its mating part 201 or 203, thereby preventing the bearing 101 from unintentionally separating from its mating part 201 or 203 and protecting the bearing from exposure to external contacts and contamination, such as foreign materials. The tool 300 protects and retains the bearing 101 with its mating part throughout the installation and/or assembly process or as long as necessary, desired, or convenient.

The tool 300 may be molded out of plastic or other suitable materials that may be more durable or less durable materials. The tool 300 may be disposable or more permanent in nature.

Although the embodiment shown in the drawings shows two fences, two flanges, two curbs, and two guideposts, one may utilize one or more fences, one or more flanges, one or more curbs, and one or more guideposts, or various combinations thereof, while successfully practicing the present invention. The shape of the bearing and its mating part will determine how many of each of these elements is needed or desired.

The present invention is illustrated with an example of insertion of bearings 101 into connecting rods 201 and caps 203 formed by a cracking process, the tool 300 may be utilized with connecting rods 201 and caps 203 formed utilizing other methods. The present invention may be utilized for other applications than insertion of bearings into connecting rods and caps.

The present invention provides an installation tool that positions a bearing both axially and angularly within respect to its mating part, such as a connecting rod or cap. The tool provides a way to avoid handling a bearing while limiting physical contact by a human. The tool keeps contaminants away from the bearing surface and protects the bearing from damage during engine assembly. The use of costly and complex tangs and notches is eliminated. Bearings are held in place with their mating part with more reliability than with the used of tangs. Bearings may be inserted using one hand. When bearings are sold in the aftermarket with a tool attached, the bearing is protected during shipping and handling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a saddle having a first peripheral surface capable of seating a peripheral surface of a bearing, the saddle having a first edge along a first length of the saddle and a second edge along a first width of the saddle;
   a first fence, disposed near the first edge of the saddle and extending away from the first peripheral surface in a first substantially perpendicular direction;
   a first flange, disposed near the second edge of the saddle and extending from the first peripheral surface in a second substantially perpendicular direction; and
   a first curb disposed in a junction of the first fence and the first peripheral surface of the saddle.

2. The apparatus of claim 1, wherein the first curb is capable of separating the bearing from the first fence.

3. The apparatus of claim 1, wherein the saddle further comprises a third edge along a second length of the saddle and wherein the apparatus further comprises a second fence, disposed near the third edge of the saddle and extending away from the first peripheral surface in the first substantially perpendicular direction.

4. The apparatus of claim 3, further comprising a second curb disposed in a corner formed by the second fence and the first peripheral surface of the saddle, such that the second curb is capable of separating the bearing from the second fence.

5. The apparatus of claim 1, wherein the saddle further comprises a fourth edge along a second width of the saddle and wherein the apparatus further comprises a second flange, disposed near the fourth edge of the saddle and extending away from the first peripheral surface in a third substantially perpendicular direction.

6. The apparatus of claim 5, wherein the first flange and the second flange are substantially co-planar.

7. The apparatus of claim 5, further comprising a first guidepost disposed on the first flange and a second guidepost disposed on the second flange.

8. The apparatus of claim 1, further comprising a member extending away from a second peripheral surface of the saddle, such that the member facilitates removal of the apparatus.

9. The apparatus of claim 1, wherein the first peripheral surface of the saddle is generally semi-circular in shape.

10. The apparatus of claim 1, further comprising a bearing seated in the saddle.

11. The apparatus of claim 1, wherein the apparatus facilitates positioning of the bearing with respect to a mating part in at least one of an angular direction and an axial direction.

12. The apparatus of claim 1, wherein the apparatus facilitates seating of the bearing with its mating part.

13. An installation tool comprising:
   a saddle having a first peripheral surface capable of seating a peripheral surface of a bearing, the saddle having a first edge along a first length of the saddle, a second edge along a second length of the saddle, a third edge along a first width of the saddle, and a fourth edge along a second width of the saddle;
   a first fence, disposed near the first edge of the saddle and extending away from the first peripheral surface in a first substantially perpendicular direction;

a second fence, disposed near the second edge of the saddle and extending away from the first peripheral surface in the first substantially perpendicular direction;

a first flange, disposed near the third edge of the saddle and extending away from the first peripheral surface in a second substantially perpendicular direction, a second flange, disposed near the fourth edge of the saddle and extending away from the first peripheral surface in a direction substantially opposite to the second substantially perpendicular direction; and a first curb disposed on the first peripheral surface of the saddle and near the first edge;

wherein the installation tool facilitates positioning of the bearing with respect to a mating part.

14. The installation tool of claim 13, wherein the first curb is capable of separating the bearing from the first fence.

15. The installation tool of claim 13, wherein the first fence, the second fence, and the first curb each have an edge in a plane that is substantially perpendicular to the first flange.

16. The installation tool of claim 13, further comprising a second curb disposed in a junction of the second fence and the first peripheral surface of the saddle, such that the second curb is capable of separating the bearing from the second fence.

17. The installation tool of claim 16, wherein the first fence, the second fence, and the second curb each have an edge in a plane that is substantially perpendicular to the second flange.

18. The installation tool of claim 13, wherein the first flange and the second flange are substantially co-planar.

19. The installation tool of claim 13, further comprising a first guidepost disposed on the first flange and a second guidepost disposed on the second flange.

20. The installation tool of claim 13, further comprising a member extending away from a second peripheral surface of the saddle, such that the member facilitates removal of the installation tool.

21. The installation tool of claim 13, wherein the first peripheral surface of the saddle is generally semi-circular in shape.

22. An installation tool combined with a bearing comprising:

a saddle having a first peripheral surface capable of seating a peripheral surface of the bearing, the saddle having a first edge along a first length of the saddle, a second edge along a second length of the saddle, a third edge along a first width of the saddle, and a fourth edge along a second width of the saddle;

a first fence, disposed near the first edge of the saddle and extending away from the first peripheral surface in a first substantially perpendicular direction;

a second fence, disposed near the second edge of the saddle and extending away from the first peripheral surface in the first substantially perpendicular direction;

a first flange, disposed near the third edge of the saddle and extending away from the first peripheral surface in a second substantially perpendicular direction, a second flange, disposed near the fourth edge of the saddle and extending away from the first peripheral surface in a direction substantially opposite to the second substantially perpendicular direction;

a bearing seated in the saddle.

23. The installation tool of claim 13, wherein the installation tool facilitates positioning of the bearing with respect to a mating part in at least one of an angular direction and an axial direction.

24. The installation tool of claim 13, wherein the installation tool facilitates seating of the bearing with its mating part.

* * * * *